United States Patent
Crouan

(10) Patent No.: US 7,527,148 B2
(45) Date of Patent: May 5, 2009

(54) DISC-SHAPED PACKAGE FOR A DIGITAL RECORDING MEDIUM

(75) Inventor: Alain Crouan, Le Mans (FR)

(73) Assignee: MIP Packaging — Moulage Industriel de Perseigne (FR)

( * ) Notice: Subject to any disclaimer, the term of this patent is extended or adjusted under 35 U.S.C. 154(b) by 94 days.

(21) Appl. No.: 11/632,242

(22) PCT Filed: Jul. 15, 2005

(86) PCT No.: PCT/FR2005/050588

§ 371 (c)(1),
(2), (4) Date: Aug. 13, 2007

(87) PCT Pub. No.: WO2006/016092

PCT Pub. Date: Feb. 16, 2006

(65) Prior Publication Data

US 2008/0257764 A1 Oct. 23, 2008

(30) Foreign Application Priority Data

Jul. 15, 2004 (FR) .................................. 04 51537

(51) Int. Cl.
*B65D 85/57* (2006.01)
(52) U.S. Cl. .................................. 206/308.1; 206/804
(58) Field of Classification Search ............. 206/308.1, 206/310, 313, 232, 449, 555, 804
See application file for complete search history.

(56) References Cited

U.S. PATENT DOCUMENTS

| 774,037 | A | 11/1904 | Bürgi |
| 5,533,615 | A | 7/1996 | McCamy |
| 5,690,218 | A | 11/1997 | McCamy et al. |
| 6,155,417 | A | 12/2000 | Flores, Jr. et al. |
| 6,443,300 | B1 | 9/2002 | Gelardi |
| 6,454,090 | B1 | 9/2002 | Flores, Jr. et al. |
| 2002/0033348 | A1 | 3/2002 | Flores, Jr. et al. |
| 2002/0100701 | A1 | 8/2002 | Chiu |
| 2002/0139701 | A1 | 10/2002 | Luckow |
| 2004/0055910 | A1* | 3/2004 | Boorman ................. 206/308.1 |
| 2006/0175212 | A1* | 8/2006 | Carloni .................... 206/308.1 |
| 2008/0035503 | A1* | 2/2008 | Rentzepis et al. ........ 206/308.1 |

FOREIGN PATENT DOCUMENTS

| DE | 101 31 717 A1 | 1/2003 |
| EP | 1 128 387 A1 | 8/2001 |
| FR | 2 730 087 A3 | 8/1996 |
| FR | 2 810 442 A1 | 12/2001 |
| FR | 2 846 774 A1 | 5/2004 |
| WO | WO 2004/024600 A1 | 3/2004 |

* cited by examiner

*Primary Examiner*—Jacob K Ackun, Jr.
(74) *Attorney, Agent, or Firm*—DLA Piper LLP (US)

(57) ABSTRACT

A case for supporting a disc-shaped digital recording medium formed by a tray including means for holding the disc, formed by at least two radial shoulders defined to overlap, at rest, a marginal zone of the disc, one at least of the radial shoulders being mobile between an inactive position wherein it overlaps the marginal zone of the disc and a release position wherein the shoulder releases the marginal zone, wherein at least one of the radial shoulders comprises an ejection button borne by two lateral plates linking the tray and a central plate urged to process elastically against a bottom surface of the disc and extending above the linking plates.

11 Claims, 4 Drawing Sheets

DISC-SHAPED PACKAGE FOR A DIGITAL RECORDING MEDIUM

RELATED APPLICATION

This is a §371 of International Application No. PCT/FR2005/050588, with an international filing date of Jul. 15, 2005 (WO 2006/016092 A1, published Feb. 16, 2006), which is based on French Patent Application No. 04/51537, filed Jul. 15, 2004.

TECHNICAL FIELD

The technology in this disclosures relates to the field of cases for disc-shaped digital recording media, such as CDs, DVDs and mini-CDs.

BACKGROUND

It is known that the general principle of cases comprising a centering hub on which the disc is clipped. These centering hubs generally have several deformable tabs. They can be formed by molding the bottom of a case made from plastic material or in the form of a part glued onto a cardboard support.

As an example, FR 2 810 442 describes a case for a DVD, CD or VCD consisting of a body, a cover, a molded hinge mechanism and comprising an annular projecting element. The projecting element extends upwards from the body to support a disc. This projecting element is formed by a protruding flange having flexible tabs that become lodged in the centering hole of a disc. These tabs are fragile and brittle and can break during transport or when placing or removing the disc. The broken tabs then shift around between the case and the disc and can scratch the surface of the disc.

The manufacturing cost of such a case is high since the projecting element must be molded in a complex mold, with rather low manufacturing tolerance. These tabs are generally temperature-sensitive and do not always ensure effective support for the disc.

Furthermore, when the flange is glued onto the bottom of the case, it can be pulled off and swallowed by a child.

We have also suggested in FR 2 730 087 a case made from a flexible plastic material wherein the bottom has three studs arranged vertically in relation to the bottom. The disc is wedged between these studs. This solution is not very suitable since the disc is not properly supported. In addition, the studs tend to wear out quickly.

U.S. Pat. No. 6,443,300 describes a case for a disc which comprises, in particular, a cavity for accommodating one or more discs, and disc-retaining straps connected to the base. These straps, which extend across the peripheral parts of one or more discs disposed in the cavity and hold the disc or discs in the cavity (closed position), can be moved into a release position to allow the removal of the disc or discs from the cavity.

Such a case, however, has its disadvantages. Indeed, the release of the disc or discs requires direct manual intervention on the retaining straps, thus increasing the risk of the user scratching the disc when moving the straps into their release position. Moreover, the operation consisting of moving these straps into their release position is relatively inconvenient. Indeed, this operation requires either a successive release action on each of the straps or the use of both the user's hands in order to open both straps simultaneously.

We also know from FR 2 846 774 a case for a disc-shaped digital recording medium formed by a tray having a centering device for the disc, characterized in that the tray has at least two radial shoulders disposed on either side of a median line for positioning the disc, the radial shoulders being defined to overlap, at rest, a marginal zone of the disc and to define, together with the bottom of the tray, a slot with a height that is substantially the same as the thickness of the disc.

It is not always easy to remove the disc, and it could be advantageous to provide a case that makes it easy to remove the disc from its housing.

SUMMARY

This disclosure relates to a case for supporting a disc-shaped digital recording medium formed by a tray including means for holding the disc, formed by at least two radial shoulders defined to overlap, at rest, a marginal zone of the disc, at least one of the radial shoulders being mobile between an inactive position wherein it overlaps the marginal zone of the disc and a release position wherein the shoulder releases the marginal zone, wherein at least one of the radial shoulders includes an ejection button borne by two lateral planes linking the tray and a central plate urged to press elastically against a bottom surface of the disc and extending above the linking plates.

BRIEF DESCRIPTION OF THE DRAWINGS

The disclosure will be understood better from reading the following description referring to the appended drawings relating to non-limiting examples of selected structure, wherein.

DETAILED DESCRIPTION

Figure 1:
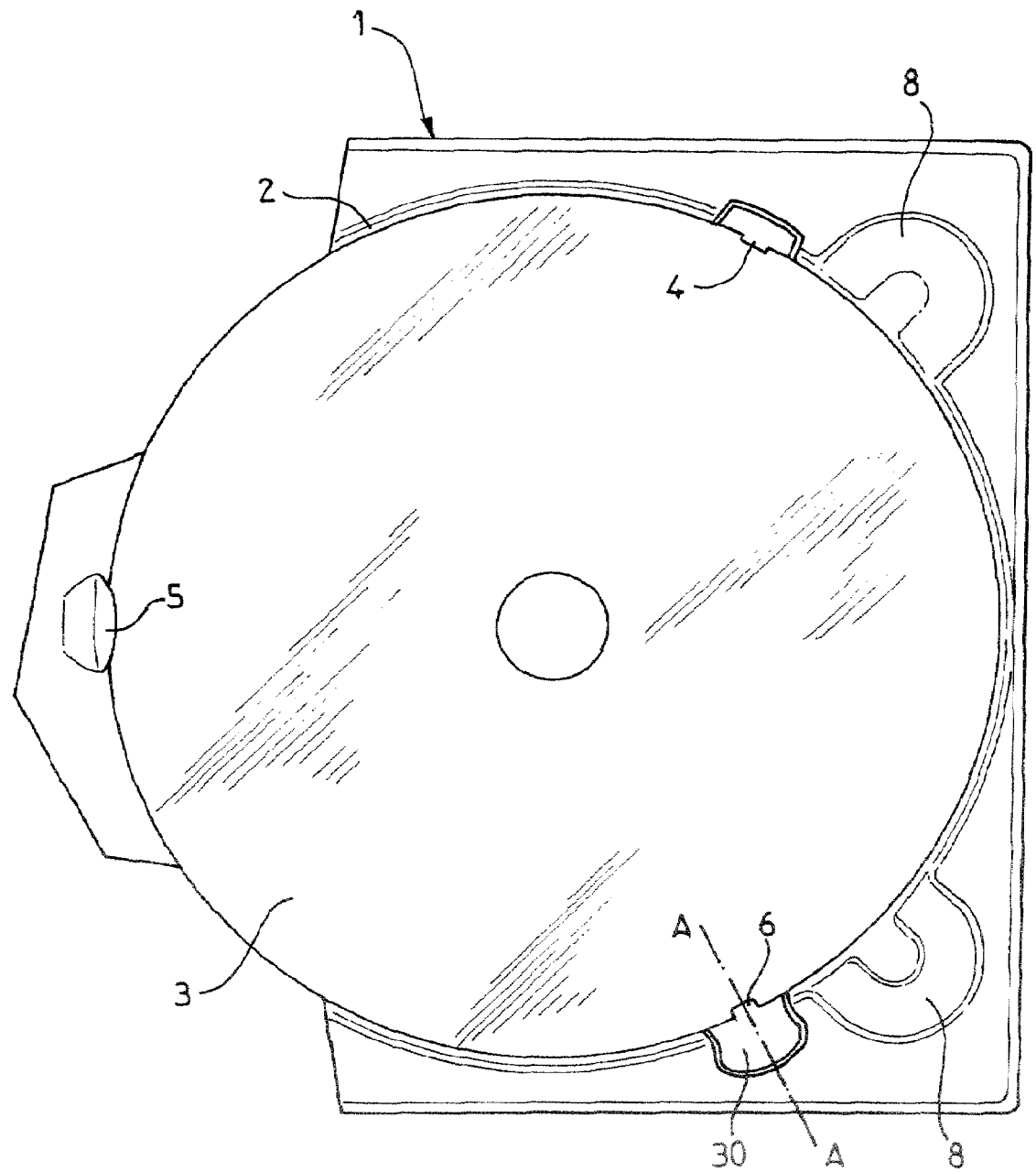
FIG. 1 shows a top view of one possible embodiment of the case.

I provide a case for supporting a disc-shaped digital recording medium, formed by a tray comprising means for holding the disc formed by at least two radial shoulders defined to overlap, at rest, a marginal zone of the disc, at least one of the radial shoulders being mobile between an inactive position wherein it overlaps the marginal zone of the disc and a release position wherein the shoulder releases the marginal zone, characterized in that the locking mobile shoulder comprises an ejection button borne by two lateral plates linking the tray and a central plate urged to press elastically against the bottom surface of the disc and extending above the linking plates.

The linking plates preferably extend the bottom of the tray in a radial direction.

According to one aspect, the bottom of the tray comprises at least one separator forming a support zone for the bottom surface of the disc, the distance between the plane passing through the support zone of the separator and the plane passing through the inner surface of the shoulders substantially matching the thickness of a disc.

According to another aspect, the height of the separator delimits a space for positioning the central plate.

According to one aspect, the tray has a cylindrical cavity with a diameter that is slightly larger than the diameter of the disc for accommodating the disc.

The cylindrical cavity is preferably extended, on the side opposite one of the shoulders by a handling zone forming a dip that opens into the cavity.

One of the shoulders advantageously overlaps a zone of the cavity, the dimension of the zone being less than 5% of the diameter of the disc.

According to one aspect, one of the shoulders is formed by a radial extension overlapping a part of the cavity, over a distance that is less than 5% of the diameter of the disc.

According to another aspect, the case comprises two locking shoulders disposed symmetrically in an angular sector of the cavity comprised between 10° and 45° in relation to the transversal diameter.

According to yet another aspect, the case also comprises a wedging shoulder equipped with a slot wherein the marginal edge of the disc is inserted, as well as a top surface tilted towards the bottom and towards the outside of the cavity.

The wedging shoulder is preferably located on the longitudinal axis of the cavity.

Turning now to the drawings, the case includes a tray (1) having a substantially cylindrical housing for accommodating a disc (3).

The tray (1) is made from plastic or any other material. It has a housing formed by a cavity (2) having an annular border and a central bottom (32) with a diameter that substantially matches that of the disc (3). It is extended by two handling housings (8) with a width of approximately 20 millimeters, making it possible to grip the edge of the disc (3) with a finger. These housings (8) have a hemispherical cross-section, the bottom of the housing opening out under the bottom surface of the disc.

The case comprises three radial shoulders (4 to 6) which locally reduce the radius of the cavity to a dimension that is smaller than the radius of the disc (3). These shoulders (4 to 6) are disposed transversally and jut out to overlap a peripheral zone of the cavity (2).

The top surface of the shoulder (4 to 6) has a bevel facing the bottom (32), which facilitates the insertion and guiding of the disc towards its housing.

The shoulders (4 to 6) project radially, overlapping the cavity by one to two millimeters, to ensure effective support of the disc (3) in the cavity (2) and easy insertion and removal of the disc by elastic deformation of part of the tray (1).

As shown in FIG. 1, at least one of the shoulders (6) provides the locking of the disc. This shoulder is extended by an ejection button (30) extending outside the cavity (2). It is placed in a cut-out section of the tray situated in the periphery of the cavity (2), and can therefore be pushed in with regard to the surface of this peripheral border.

Figure 2:
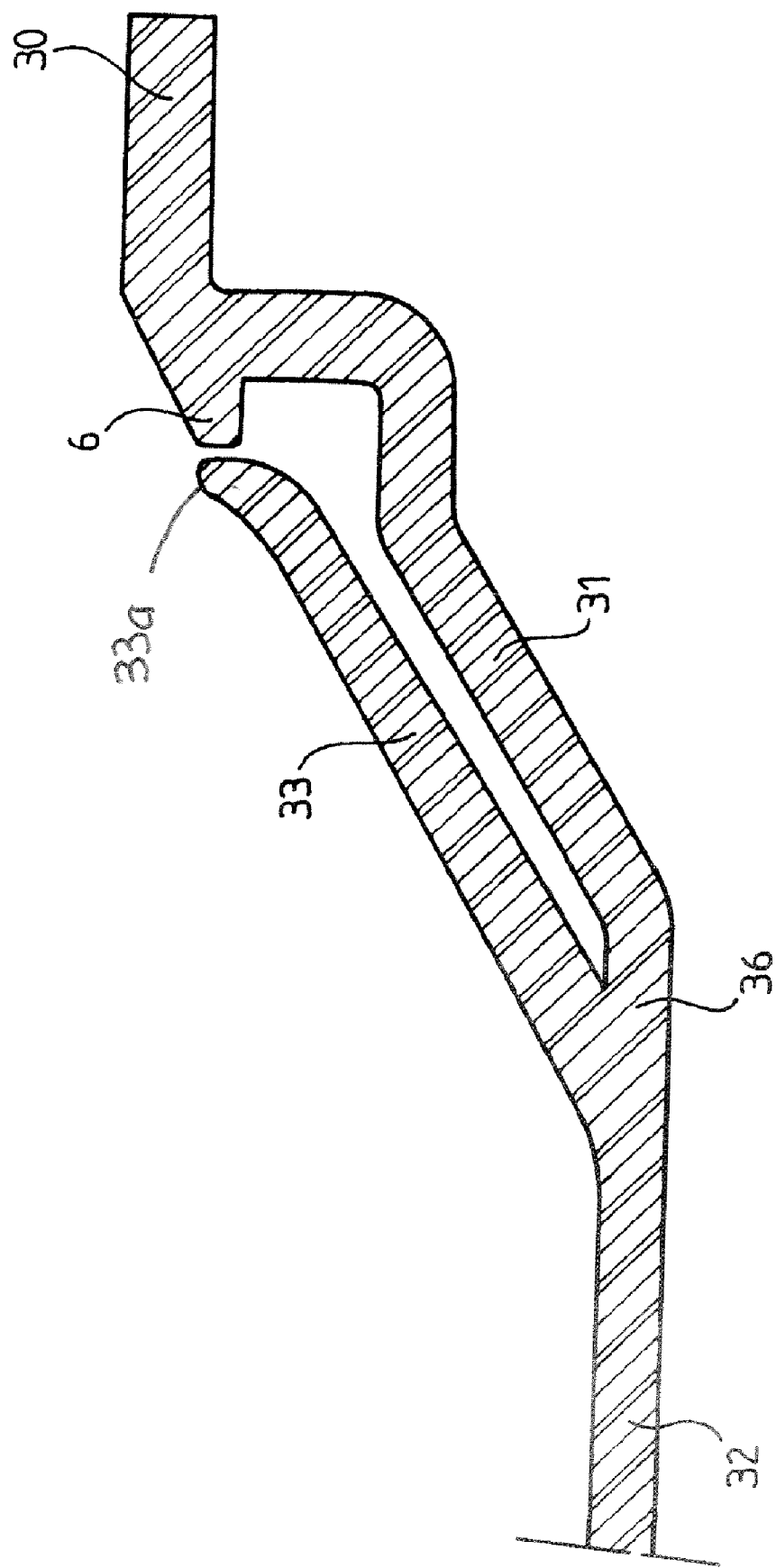
FIG. 2 shows an AA cross-section view of the case.
Figure 3:
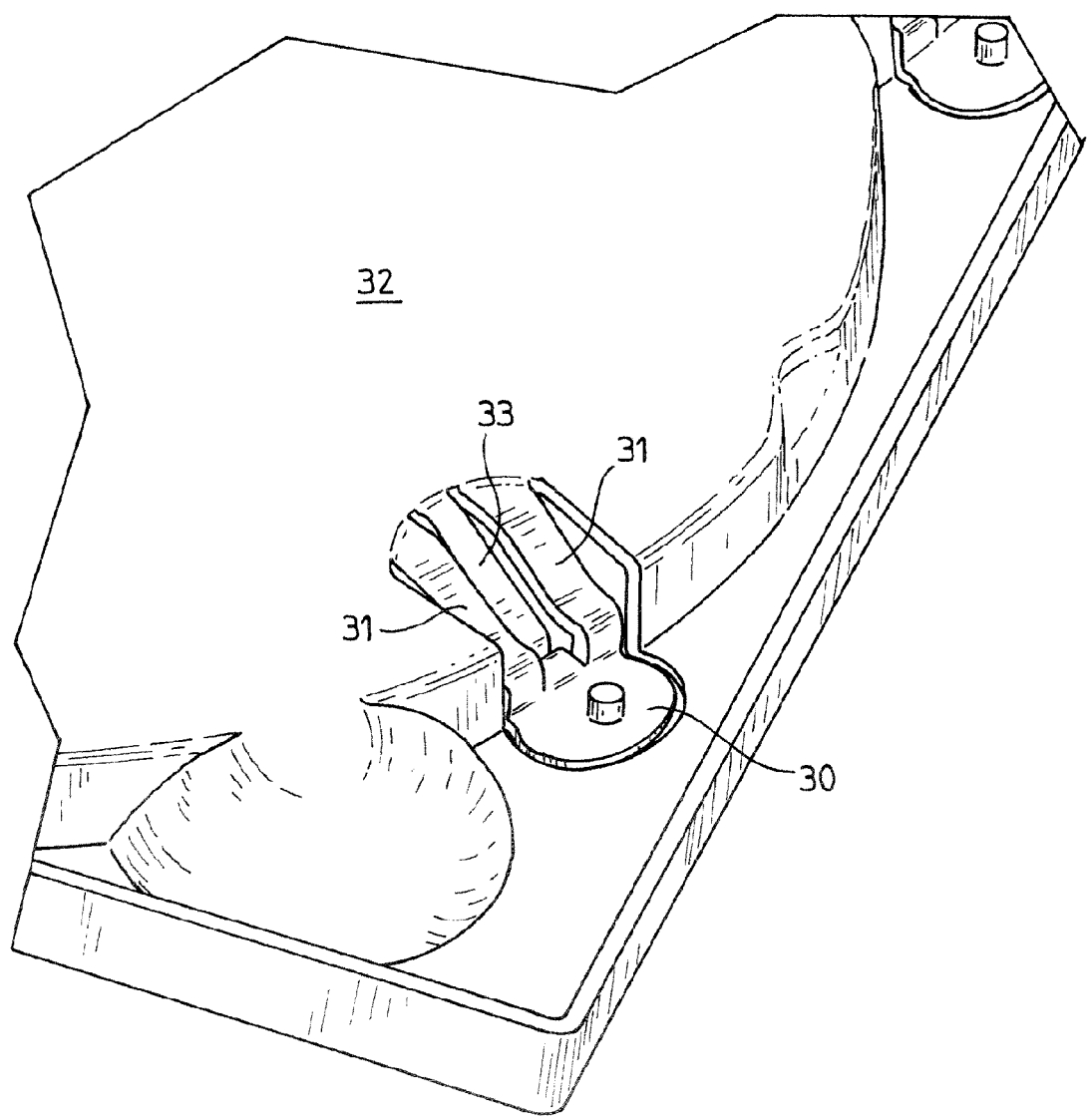
FIG. 3 shows a perspective view of the case.

As shown in detail in FIGS. 2 and 3, the ejection button (30) is borne by two elastic linking plates (31) extending radially and tiltingly towards the bottom (32) of the cavity (2) of the tray (1) with which they are solidly attached.

This button (30) is mobile: when the user exerts vertical pressure (perpendicular to the surface of the disc), the linking plates (31) deform and the button shifts elastically in relation to the zone (36) that connects it with the bottom (32). By means of this shift, the shoulder (6) is separated from the disc (3), the latter is then released and can be removed.

In order to facilitate the removal, a flexible central plate (33) forming a spring is placed between the two lateral plates (31) and exerts, by means of its free end (33a), a pressure on the bottom surface of the disc (3) to hold it under the shoulder (6). In this way, the disc is ejected when the shoulder is released (6) by elastic return of the central plate to its top inactive position.

For this purpose, the end (33a) of the spring plate (33) curves upwards and is flush with the inner edge of the shoulder (6) as shown in FIG. 2, thereby defining a separating groove of reduced thickness.

The spring plate (33) extends in a plane that is parallel to the shared plane of the other two plates (31) but shifted slightly upwards.

The central plate (33) therefore receives most of the weight of the disc.

In order to provide the clearance required for the movement of the plates (31, 33), the bottom of the case has studs (35) forming spacers which support the bottom edge of the disc.

The disc is inserted in its housing by pressing on its top surface, the disc then comes to a rest against the stop (5) and is centered automatically between the shoulders (4) and (6) before becoming blocked by snap-fitting in the cavity (2).

When the button (30) is pressed to remove the disc, it pivots by deformation of the link plates (31), which releases the disc and results in its automatic ejection by the action of the spring plate (33).

Figure 4:
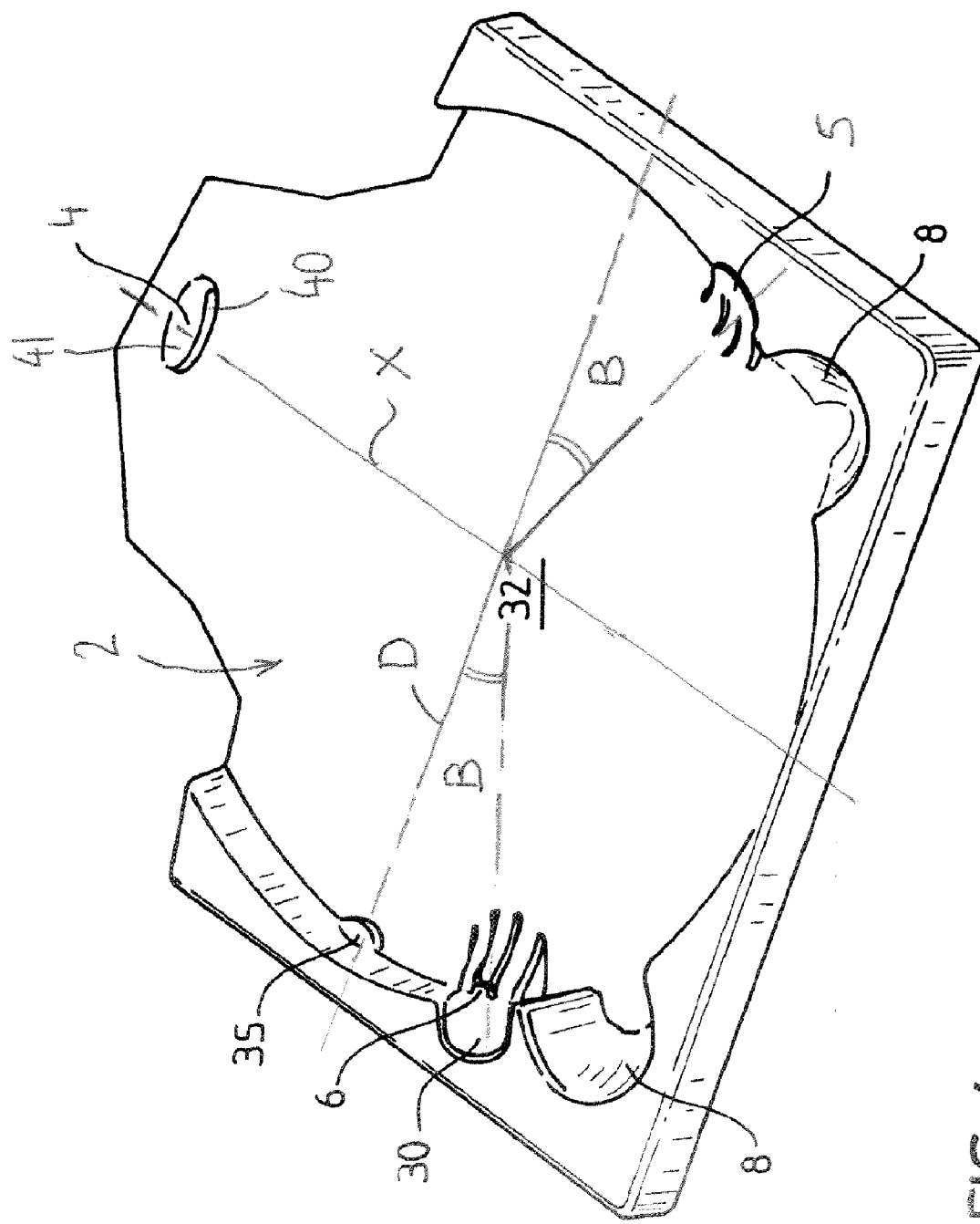
FIG. 4 shows a bottom view of the case.

According to one aspect shown in FIG. 4, one of the shoulders (4) delimits, together with the bottom (32) and on the side of the cavity (2), a wedging slot (40) wherein the edge of the disc opposite that engaged in the other shoulders (5, 6) is inserted, ensuring it is blocked in place. The shoulder (4) has a top surface tilted (41) towards the bottom and towards the outside of the cavity (2).

In this way, the disc rests along a tilted plane in the cavity (2); the top edge of the disc being kept separated from the bottom (32) of the cavity (2) by insertion in the shoulders (5, 6) with the ejection button (30) while the bottom edge is inserted in the slot (40) of the wedging shoulder (4), in contact with the bottom (32).

As shown in FIG. 4, the disc-blocking shoulders (5, 6) are preferably disposed in an angular sector B comprised between 10° and 45° in relation to the transversal diameter D of the cavity (2) passing through the studs (35) and symmetrically on either side of the longitudinal axis X of the cavity (2). The wedging shoulder (4) is, on the other hand, located on the longitudinal axis X.

This aspect is best adapted to a case for several discs.

In this case, the discs are partially overlapping and the cavity (2) is extended laterally by at least one second adjacent cavity (shown partially in FIG. 4) equipped with shoulders according to the invention and intended for accommodating at least one other disc.

The tray (1) is formed by molding or possibly by thermoforming a transparent plastic material. It has a cavity (2) intended, as in the preceding cases, for accommodating a disc. This cavity is oval-shaped, longer on the axis that passes through the housing (8) that can receive a finger.

The tray has an edge forming a peripheral frame. This contributes to the rigidity of the tray by reducing deformation by twisting, and therefore makes it possible to reduce the thickness of the tray (1).

Furthermore, it has four zones for gluing the tray onto a sheet of cardboard or a case.

The disclosure is described above by way of an example. It is evident that those skilled in the trade will be capable of manufacturing different aspects of the disclosure without thereby departing from the scope of the appended claims.

The invention claimed is:

1. A case for supporting a disc-shaped digital recording medium formed by a tray comprising: means for holding the disc, formed by at least two radial shoulders defined to overlap, at rest, a marginal zone of the disc, at least one of the radial shoulders being mobile between an inactive position wherein it overlaps the marginal zone of the disc and a release position wherein the shoulder releases the marginal zone, wherein at least one of the radial shoulders comprises an ejection button borne by two lateral linking plates linking the tray and a central plate urged to press elastically against a bottom surface of the disc and extending above the linking plates.

2. The case according to claim 1, wherein the linking plates extend the bottom of the tray in a radial direction.

3. The case according to claim 1 or 2, wherein the bottom of the tray comprises at least one separator forming a support zone for the bottom surface of the disc, the distance between a plane passing through the support zone of the separator and a plane passing through an inner surface of the radial shoulders substantially matching the thickness of the disc.

4. The case according to claim 1, wherein the tray has a cylindrical cavity to accommodate the disc.

5. The case according to claim 4, wherein the cavity has a diameter that is slightly larger than the diameter of the disc.

6. The case according to claim 4, wherein the cylindrical cavity is extended, on a side opposite one of the shoulders, by a handling zone forming a dip that opens into the cavity.

7. The case according to claim 4, wherein one of the shoulders overlaps a zone of the cavity, the dimension of the zone being less than 5% of the diameter of the disc.

8. The case according to claim 4, wherein one of the shoulders is formed by a radial extension overlapping a part of the cavity over a distance that is less than 5% of the diameter of the disc.

9. The case according to claim 4, wherein the two radial shoulders disposed symmetrically in an angular sector B of the cavity comprise between 10° and 45° in relation to a transversal diameter D of the cavity.

10. The case according to claim 4, further comprising a wedging shoulder equipped with a slot wherein the marginal edge of the disc is inserted, as well as a top surface tilted towards the bottom and towards the outside of the cavity.

11. The case according to claim 10, where the wedging should is located on the longitudinal axis X of the cavity.

* * * * *